United States Patent

[11] 3,548,830

| [72] | Inventors | Wilhelm Goey<br>Boppard(Rhine), and<br>Paul Brinckmann, Bonn, Germany |
|---|---|---|
| [21] | Appl. No. | 776,047 |
| [22] | Filed | Nov. 15, 1968 |
| [45] | Patented | Dec. 22, 1970 |
| [73] | Assignee | DMB-Apparatebau and Hans-Mueller<br>Bernhardt,<br>a German corporation |
| [32] | Priority | Nov. 15, 1967 |
| [33] | | Germany |
| [31] | | No. 1,566,065 |

[54] DEVICE FOR PUNCTURING OF STRETCHED MEMBRANE SKINS
4 Claims, 3 Drawing Figs.

| [52] | U.S. Cl. | 128/361,<br>128/302 |
|---|---|---|
| [51] | Int. Cl. | A61b 17/24<br>A61m 1/00 |
| [50] | Field of Search | 128/361,<br>302, 303, 297, 215, 2 |

[56] References Cited
UNITED STATES PATENTS

| 2,835,253 | 5/1958 | Borgeson | 128/303 |
| 2,945,496 | 7/1960 | Fosdal | 128/297 |
| 3,039,465 | 6/1962 | Berger | 128/283 |
| 3,410,269 | 11/1968 | Hovick | 128/361 |

*Primary Examiner*—Dalton L. Truluck
*Attorney*—Hill, Sherman, Meroni, Gross & Simpson ABSTRACT: A device puncturing or piercing stretched or tensed membranes without causing rupture thereof and including a pilot member for relaxing tension in an area of the membrane to be punctured and for guiding a hollow needle. The pilot device may have a truncated conical configuration with a central pilot bore therethrough for guiding the needle and a pair of annular, radially spaced grooves formed concentrically of the pilot bore in a small, front end surface of the pilot device. A passageway extends rearwardly from each groove and opens at a rear portion of the pilot device to provide connections for the grooves to a suction source. By gently contacting the grooved end of the pilot device with the tensed membrane, sequentially applying a suction to the inner and outer grooves and then releasing the suction on the inner-groove, the area of the membrane to be pierced will be relaxed, and thus, permit the membrane to be punctured without fear of rupture.

PATENTED DEC 22 1970

3,548,830

INVENTORS
Wilhelm Goey
Paul Brinckmann

BY Hill, Sherman, Meroni, Gross & Simpson

ATTORNEYS 3,548,830

DEVICE FOR PUNCTURING OF STRETCHED MEMBRANE SKINS

BACKGROUND OF THE INVENTION

Field of the Invention

This invention generally relates to devices for puncturing tensed membrane skins, and more particularly refers to a device for puncturing tensed membranes, such as an amniotic membrane, without causing rupture thereof.

Description of the Prior Art

Various medical operations may require piercing or puncturing a tensed or stretched membrane, and one such operation includes piercing the amniotic membrane to withdraw a sample of the amniotic fluid or to inject fluid into the amniotic sac. Prior art devices have not provided means for assuring that the amniotic membrane, which, especially in the latter stages of pregnancy, is under extreme tension, will not break open at the puncture point or, after the puncturing, that the puncture place will again close. Rupturing of the amniotic membrane or failure of a puncture therethrough to properly close, may lead to an escape of the amniotic fluid or secondary oozing, and thus, gradual loss of the amniotic fluid which may result in abortion.

SUMMARY OF THE INVENTION

The present invention provides a device for puncturing or piercing a tensed membrane, such as an amniotic membrane, without danger of the membrane rupturing or bursting. The device includes a pilot member for guiding a hollow needle into piercing contact with the membrane and also for relaxing tension in an area of the membrane to be pierced. The pilot member may have a truncated conical configuration with a smaller end surface thereof forming a front end of the member. A centrally disposed guide bore if provided permitting the introduction of a hollow needle through the pilot member, and this bore may be conically enlarged toward the rear to facilitate the introduction thereinto of the hollow needle.

The front face or surface of the pilot member has a pair of radially spaced grooves formed concentrically of the guide bore and connectable by means of longitudinal passageways formed in the pilot member to a vacuum pump. The truncated conical configuration is merely a preferred form, and the pilot member may have a cylindrical configuration or any other convenient configuration. The pilot member should be formed of a material compatible with metal, and such materials are stainless steel or various plastics.

In operation, the pilot member is inserted in the usual manner through the cervical canal until the front face thereof lightly bears against the outer amniotic membrane. When the front face surface is properly positioned, a vacuum is first applied to the innerannular groove causing the membrane to be drawn into the groove, subsequently a vacuum is applied to the outer annular groove again causing a portion of the membrane to be drawn thereinto. Next, the vacuum applied to the innerannular groove is released, thereby to cause a portion of the amniotic membrane overlying the guide bore to be relaxed permitting this area to be safely punctured. Finally, the suction applied to the outer annular groove is slowly released and the pilot member withdrawn.

BRIEF DESCRIPTION OF THE DRAWINGS

In the accompanying drawings forming a part of this specification and in which like reference numerals are employed to designate like parts throughout the same.

DESCRIPTION OF THE PREFERRED EMBODIMENT

Figure 1:
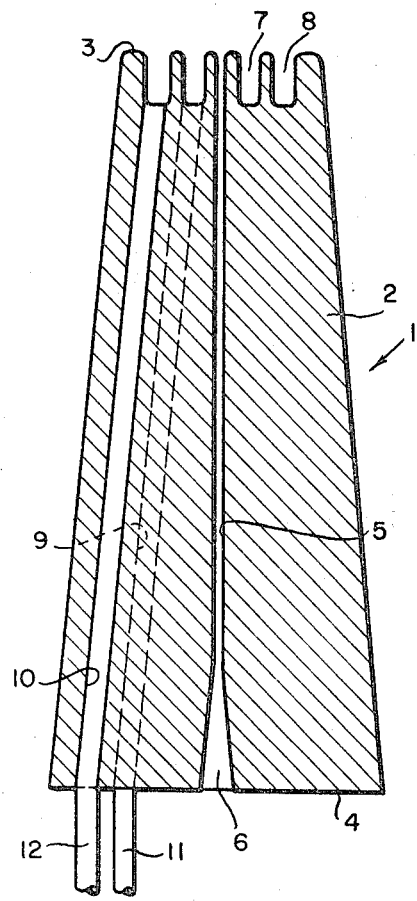
FIG. 1 is a vertical sectional view of a puncturing or piercing device embodying the features of the present invention.
Figure 2:
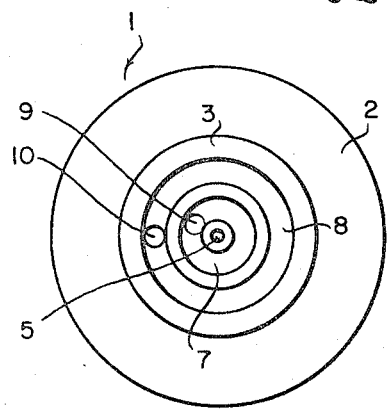
FIG. 2 is an end view of the device illustrated in FIG. 1.
Figure 3:
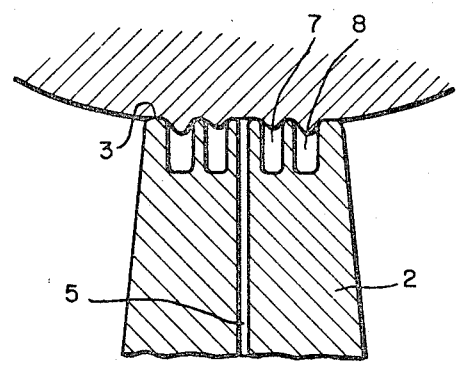
FIG. 3 is a partial, vertical sectional view of the device shown in FIGS. 1 and 2 and illustrating a method of using the device.

Referring to the drawings, there is shown a device to facilitate piercing or puncturing of a tensed or stretched membrane, such as an amniotic membrane and generally designated at 1. To withdraw amniotic fluid, or to inject fluid into an amniotic sac, the amniotic membrane which is under extreme tension especially in latter stages of pregnancy, must be pierced by a hollow needle (not shown). When the amniotic membrane is pierced, it is essential that the membrane does not rupture and that the puncture properly closes, otherwise, seepage or escape of the amniotic fluid may result causing an abortion.

In accordance with the present invention, the piercing device 1 includes a pilot member 2 having a truncated conical configuration with a smaller end thereof, as at 3, forming a front end of the member and with the larger end thereof, as at 4, forming a rear end of the member. The pilot member 2 has a centrally formed guide bore 5 to provide a pilot for the hollow needle which pierces the membrane. The guide bore 5 is characterized by a conically enlarged rearward portion 6 to facilitate introducing the needle into the guide bore.

The front face or surface 3 includes a pair of radially spaced annular grooves 7 and 8 formed concentrically of the guide bore 5. Passageways 9 and 10 are longitudinally formed in the pilot member 2 and, respectively, extend rearwardly from the innerannular groove 7 and the outer annular groove 8. Suitable tubes 11 and 12 respectively connect the passageways 9 and 10 with a vacuum source.

In accordance with the present invention, when the device 1 is utilized for the piercing or puncturing of the amniotic membrane the portio uteri is adjusted in the usual manner with a specula and the pilot member 2 is introduced into the cervical canal until the front face surface 3 bears lightly on the amniotic membrane. The conical configuration of the pilot member 2 facilitates safe dilatation of the cervical canal.

When the pilot member 2 is properly inserted and the face surface 3 thereof is brought into the desired position, a vacuum is first applied to the innerannular groove 7, thereby to cause the amniotic membrane to be drawn into the groove 7. Subsequent to a vacuum being applied to the innergroove, a vacuum is also applied to the outer annular groove 8 resulting in another portion of the amniotic membrane being drawn into the outer groove. Next, the vacuum applied to the innerannular groove 7 is discontinued to release the portion of the amniotic membrane drawn into the innergroove. With the vacuum released from the innerannular groove, the amniotic membrane loosely rests over the central guide bore 5.

After performing the above-identified steps, the hollow needle is inserted through the central guide bore 2 into piercing contact with the relaxed portion of the amniotic membrane overlying the central bore. Since the area of the membrane which is pierced by the hollow needle is in a relatively relaxed condition, this portion of the membrane may be safely pierced without tearing or rupturing of the membrane. The vacuum applied to the outer annular groove 8 is continued until the hollow needle is extracted.

After the membrane has been pierced and the needle extracted, the vacuum on the outer annular groove 8 is slowly nullified permitting gradual release of the amniotic sac. Subsequent to release in the vacuum in the outer annular groove, the pilot member 2 may be removed in the usual manner.

Although the device of the present invention is particularly applicable for gynecological purposes in human medicine, the principles of the present invention are also applicable to veterinary medicine with the device being correspondingly dimensioned. For purposes of human medicine, the pilot member 2 has, for example, a length of approximately 65 millimeters and the face surface 3 has a diameter of 16 millimeters with the annular grooves 7 and 8 being approximately 4 to 5 millimeters wide.

Although various minor modifications might be suggested by those versed in the art, it should be understood that we wish to embody within the scope of the patent warranted hereon all such modifications as reasonably and properly come within the scope of our contribution to the art.

We claim:

1. A device for piercing tensed membranes comprising a pilot member for relaxing a portion of the tensed membrane and for guiding a hollow tube into piercing contact with the membrane, the pilot member having a front face surface, a centrally formed bore for guiding the introduction of said hollow needle, a pair of radially spaced, annular grooves recessed into the face surface, and means forming passageways separately connecting each said annular groove with a vacuum source.

2. A device as defined in claim 1 and further characterized by said pilot member having a truncated conical configuration with a smaller end thereof forming said front face surface.

3. A device as defined in claim 1 and further characterized by said centrally disposed bore having a conically enlarged rearward portion to facilitate introduction thereinto of said needle.

4. A method of piercing a tensed membrane comprising the steps of:

lightly contacting a face surface of a pilot member with the member, the pilot member having a centrally disposed guide bore formed therethrough and a pair of radially spaced, annular grooves recessed in the face surface concentrically of the guide bore and separately connectable with a vacuum source;

applying a vacuum to an inner-one of the grooves;

applying a vacuum to an outer-one of the grooves;

releasing the vacuum from the innergroove;

inserting a needle through said guide bore into piercing contact with the membrane;

extracting the needle; and slowly releasing the vacuum from the outer groove.

UNITED STATES PATENT OFFICE
CERTIFICATE OF CORRECTION

Patent No. 3,548,830            Dated December 22, 1970

Inventor(s)    Wilhelm Goey and Paul Brinckmann

It is certified that error appears in the above-identified patent and that said Letters Patent are hereby corrected as shown below:

Column 1, line 36, after "provided" and before "permitting" insert --for--. Column 4, line 7, cancel the first occurrence of "member" and insert therefor --membrane--.

Signed and sealed this 13th day of July 1971.

(SEAL)
Attest:

EDWARD M. FLETCHER, JR.         WILLIAM E. SCHUYLER,
Attesting Officer                 Commissioner of Pater